(12) United States Patent
Hong et al.

(10) Patent No.: US 8,746,285 B2
(45) Date of Patent: Jun. 10, 2014

(54) PROGRAMMABLE FLUIDIC DROPLET GENERATION

(75) Inventors: Jong Wook Hong, Auburn, AL (US); Se-Kwon Kim, Pusan (KR)

(73) Assignee: Auburn University, Auburn, AL (US)

( * ) Notice: Subject to any disclaimer, the term of this patent is extended or adjusted under 35 U.S.C. 154(b) by 650 days.

(21) Appl. No.: 12/724,734

(22) Filed: Mar. 16, 2010

(65) Prior Publication Data

US 2011/0056575 A1 Mar. 10, 2011

Related U.S. Application Data

(60) Provisional application No. 61/240,077, filed on Sep. 4, 2009.

(51) Int. Cl.
*B01F 5/04* (2006.01)

(52) U.S. Cl.
USPC .............................. 137/897; 251/5; 422/224

(58) Field of Classification Search
USPC ................. 137/602, 896, 897; 251/5; 422/224
See application file for complete search history.

(56) References Cited

U.S. PATENT DOCUMENTS

| 7,556,776 | B2 * | 7/2009 | Fraden et al. ................. 422/504 |
| 2005/0172476 | A1 * | 8/2005 | Stone et al. .................. 29/592.1 |
| 2006/0073035 | A1 * | 4/2006 | Sundararajan ................ 417/412 |
| 2007/0006926 | A1 * | 1/2007 | Prakash et al. ................ 137/800 |
| 2008/0166720 | A1 * | 7/2008 | Hsieh et al. ....................... 435/6 |
| 2009/0075390 | A1 * | 3/2009 | Linder et al. .................. 436/161 |
| 2009/0302244 | A1 * | 12/2009 | Wedel ................................ 251/5 |
| 2011/0103176 | A1 * | 5/2011 | Van Dam et al. .......... 366/154.1 |
| 2011/0151578 | A1 * | 6/2011 | Abate et al. .................... 436/180 |

FOREIGN PATENT DOCUMENTS

WO WO 2009/139898 * 11/2009

OTHER PUBLICATIONS

Lee et al., "Predictive model on micro droplet generation through mechanical cutting" Microfluid Nanofluid, 2009, 7:431-438.
Copeland, R.A. "Mechanistic considerations in high-throughput screening" Analytical Biochemistry, 2003, 320:1-12.
Cortes et al., "Relationships between inhibition constants, inhibitor concentrations for 50% inhibition and types of inhibition: new ways of analysing data" Biochem J., 2001, 357:263-268.
Rozman et al., "A Toxicologist's View of Cancer Risk Assessment", Drug Metabolism Reviews, 28(1&2), 29-52, 1996.
Waddell, W.J., "Thermodynamic basis for expressing dose logarithmically" Toxicology and Applied Pharmacology 2008, 228:156-157.
Seefeldt et al., "Log-Logistic Analysis of Herbicide Dose-Response Relationships" Weed Technology, 1995, vol. 9:218-227.
Kerby et al., "A fluorogenic assay using pressure-driven flow on a microchip", Electrophoresis, 2001, 22:3916-3923.

(Continued)

*Primary Examiner* — John K Fristoe, Jr.
*Assistant Examiner* — Reinaldo Sanchez-Medina
(74) *Attorney, Agent, or Firm* — Haverstock & Owens LLP

(57) ABSTRACT

A programmable fluidic device for generating droplets with resolutions of micrometer in size and milliseconds in generation timing is provided. The programmable fluidic device has a valve forming a droplet cutter, which contains a fluid deflectable membrane capable of controlling the flow of a dispensing fluid from a fluidic dispensing channel. The programmable fluidic device is able to perform temporal control over the droplet generation independent from the size control.

12 Claims, 13 Drawing Sheets

(56) References Cited

OTHER PUBLICATIONS

Song et al., "Millisecond Kinetics on a Microfluidic Chip Using Nanoliters of Reagents" J. Am. Chem. Soc. 2003, 125:14613-14619.

Duffy et al., "Microfabricated Centrifugal Microfluidic Systems: Characterization and Multiple Enzymatic Assays" Analytical Chemistry, vol. 71, No. 20, Oct. 15, 1999, pp. 4669-4678.

Miller et al., "A Digital Microfluidic Approach to Homogeneous Enzyme Assays", Anal. Chem, 2008, 80, 1614-1619.

Kang et al., "Development of a microplate reader compatible microfluidic device for enzyme assay" Sensors and Actuators B 107 (2005) 980-985.

Hadd et al., "Microchip Device for Performing Enzyme Assays" Anal. Chem. 1997, 69:3407-3412.

Jambovane et al., "Creation of Stepwise Concentration Gradient in Picoliter Droplets for Parallel Reactions of Matrix Metalloproteinase II and IX" Anal. Chem. 2011, 83:3358-3364.

Thorsen et al., "Dynamic Pattern Formation in a Vesicle-Generating Microfluidic Device", Physical Review Letters, 2001, vol. 86, No. 18, 4163-4166.

Bui et al., "Enzyme Kinetic Measurements Using a Droplet-Based Microfluidic System with a Concentration Gradient" Anal. Chem., 2011, 83:1603-1608.

Quintero et al., "Quality Control Procedures for Dose-Response Curve Generation Using Nanoliter Dispense Technologies" J. Biomolecular Screening, 2007, 12(6), pp. 891-899.

Masse et al., "Compound Transfer to 3456—well Assay Plates Using the Echo™ 550." This is a reformatted version of a poster presented at the Society for Biomolecular Screening, Sep. 2005, Orlando, Florida.

Ellson et al., "Transfer of Low Nanoliter volumes between Microplates Using Focused Acoustics-Automation Considerations" JALA, 2003, 8:29-34.

Dunn et al., "Challenges and solutions to ultra-high-throughput screening assay miniaturization: submicroliter fluid handling" DDT, 20000, vol. 5, No. 12 (Suppl.) pp. S84-S91.

McGrath et al., "Simultaneous measurements of Actin Filament Turnover, filament Fraction, and Monomer Diffusion in Endothelial Cells" Biophysical Journal, Oct. 1998, vol. 75, pp. 2070-2078.

Olechno et al., "Improving IC50 Results with Acoustic Droplet Ejection" JALA, Aug. 2006, 11:240-246.

Lee et al., "2-layer based microfluidic concentration generator by hybrid serial and volumetric dilutions" Biomed Microdevices, 2010, 12:297-309.

MacDonald et al., "Correction of fluorescence inner filter effects and the partitioning of pyrene to dissolved organic carbon" Analytica Chimica Acta, 1997, 338:155-162.

Liu et al., "Use of a Fluorescence Plate Reader for Measuring Kinetic Parameters with Inner Filter Effect Correction" Analytical Biochemistry, 1999, 267:331-335.

Fanget et al., "Correction of Inner Filter Effect in Mirror Coating Cells for Trace Level Fluorescence Measurements" Anal. Chem., 2003, 75:2790-2795.

Kubista et al., "Experimental Correction for the Inner-filter Effect in Fluorescence Spectra" Analyst, Mar. 1994, vol. 119, 417-419.

Lakowicz, J.R., Book Review. "Principles of Fluorescence Spectroscopy", Third Edition, J. Biomedical Optics, Mar./Apr. 2008, vol. 13(2), pp. 1-2.

Gu et al., "Improvement of Inner Filter Effect Correction Based on Determination of Effective Geometric Parameters Using a Conventional Fluorimeter", Anal. Chem., 2009, 81:420-426.

Rao, B.G. "Recent Developments in the Design of Specific Matrix Metalloproteinase Inhibitors aided by Structural and Computational Studies", Current Pharmaceutical Design, 2005, 11:295-322.

Asahi et al., "Role for Matrix Metalloproteinase 9 After Focal Cerebral Ischemia: Effects of Gene Knockout and Enzyme Inhibition With BB-94", Journal of Cerebral Blood Flow and Metabolism, 2000, 20:1681-1689.

Rasmussen et al., "Matrix Metalloproteinase Inhibition as a Novel Anticancer Strategy: A Review with Special Focus on Batimastat and Marimastat" Pharmacol. Ther., 1997, vol. 75, No. 1, pp. 69-75.

Abate et al., "High-throughput injection with microfluidics using picoinjectors" PINAS, Nov. 9, 2010, vol. 107, No. 45, pp. 19163-19166.

Jambovane et al., "Determination of Kinetic Parameters, Km and Kcat, with a Single Experiment on a Chip", Anal. Chem, 2009, 81:3239-3245.

* cited by examiner

1:0.5 = 1($CdCl_2$+MAP) : 0.5($Na_2S$+NaOH)   1:1 = 1($CdCl_2$+MAP) : 1($Na_2S$+NaOH)

Continuous phase

PROGRAMMABLE FLUIDIC DROPLET GENERATION

CROSS-REFERENCE TO RELATED APPLICATIONS

This application claims priority from U.S. Provisional Patent Application Ser. No. 61/240,077, filed Sep. 4, 2009 and entitled "PROGRAMMABLE MICROFLUIDIC DROPLET GENERATION," which is hereby incorporated herein by reference in its entirety for all purposes.

FIELD OF THE INVENTION

The present invention relates to the field of micro-machinery. More specifically, the present invention relates to the field of fluidic device for droplet generation.

BACKGROUND OF THE INVENTION

Droplet-based microfluidic systems have come into the spotlight due to their great potential to provide new breakthroughs to scientists in the field of drug delivery, diagnostic testing, and parallel reaction control.

For the droplet based microfluidic systems, micro droplet generation is a crucial starting point and, to satisfy diverse demand, flexibility as well as precise control is required. To achieve fine control over the size, shape, and monodispersity of droplets, various microfluidic droplet generation methods have been proposed. However, temporal control over the droplet generation has not been performed independently of the size control.

SUMMARY OF THE INVENTION

In one aspect of the present application, a fluidic system comprises a droplet generating unit for controlling an interval during which droplets are generated independent from controlling a size of the droplets.

In some embodiments, the droplet generating unit comprises a fluid dispensing channel. In alternative embodiments, the fluidic system further comprises a droplet transportation channel fluidically coupling with the fluid dispensing channel. In other embodiments, the fluid dispensing channel comprises a pressure controllable valve. In some embodiments, the pressure controllable valve comprises a pressure deflectable membrane, so that a fluid dispensed via the fluid dispensing channel is able to be stopped when a pressure is applied on the deflectable membrane. In alternative embodiments, the size of the droplets is controlled by dispensing duration, which is controlled by the valve. In other embodiments, the interval of the droplet generation is controlled by an opening time of the pressure controllable valve.

In an alternative aspect of the present application, a fluidic system comprises a continuous phase flow channel and a first discrete phase flow channel fluidically coupling with the continuous phase flow channel, wherein the first discrete phase flow channel couples with a droplet generating valve.

In some embodiments, the valve comprises a pressure deflectable member. In alternative embodiments, the pressure is caused by applying a fluid. In other embodiments, the fluidic system further comprises a second discrete phase flow channel fluidically coupling with the continuous phase flow channel. The second discrete phase flow channel couples with a droplet generating valve. In some embodiments, the first discrete phase flow channel comprises a chemical substance that is different from a chemical substance in the second discrete phase flow channel. In alternative embodiments, the first discrete phase flow channel comprises a chemical substance having a concentration that is different from a concentration of a chemical substance in the second discrete phase flow channel. In other embodiments, the fluidic system further comprises a mixing region having a configuration for facilitating the mixing. In some embodiments, the mixing region comprises a non-linear channel. In alternative embodiments, the non-linear channel comprises a curve section. In other embodiments, the fluidic system further comprises a reaction region having a channel with a length sufficient to provide an interval needed for a chemical reaction to progress to a predetermined degree. In some embodiments, the predetermined degree comprises a conversion of at least 50% of a limiting reagent.

In another aspect of the present application, a fluidic droplet formation method comprises providing a first fluid in a first fluidic channel, passing an amount of the first fluid through a valve, and providing a pressure by a second fluidic channel to reduce or stop the fluid from passing the valve, so that a droplet is formed. The first fluidic channel couples with a valve controllable by a pressure provided by a second fluidic channel.

In some embodiments, the method further comprises controlling a size of the droplet, an amount of a substance contained in the droplet, or both by controlling a dispensing duration of the first fluid. In alternative embodiments, the size of the droplet, an amount of a substance contained in the droplet, or both is proportional to the dispensing duration, the dispensing pressure, or both. In other embodiments, the method further comprises forming plurality of droplets, wherein the intervals between the formation of the droplets are controllable by the valve. In some embodiments, the method further comprises transporting the droplet to a third fluidic channel. In alternative embodiments, the method further comprises moving a second fluid in the third fluidic channel in a substantial constant speed.

In a further aspect of the present application, a fluidic reaction method comprises timing a moving droplet in a first fluid stream in a first fluidic channel and providing an amount of a chemical substance to the moving droplet via a second fluidic channel when the moving droplet arrives in a proximity of an outlet of the second fluidic channel.

In some embodiments, the method further comprises forming a moving droplet by a droplet generator. In alternative embodiments, the droplet generator is located approximately at the junction of a second fluidic channel and the first fluidic channel. In other embodiments, the droplet generator comprises a fluid controllable valve. In some embodiments, the moving droplet and the chemical substance form an enclosed boundary within a stream of the first fluid. In alternative embodiments, the method further comprises merging the chemical substance with the moving droplet and becoming a second droplet. In other embodiments, the method further comprises causing the second droplet mixing more thoroughly by passing the second droplet through a section of a non-linear fluidic channel. In some embodiments, the method further comprises transporting the second droplet in a section of fluidic channel allowing a progress of a chemical reaction.

DETAILED DESCRIPTION OF THE PREFERRED EMBODIMENT

A programmable microfluidic and/or fluidic device for generating micro droplets with resolutions of micrometer in size and millisecond in generation timing is provided.

Figure 1:
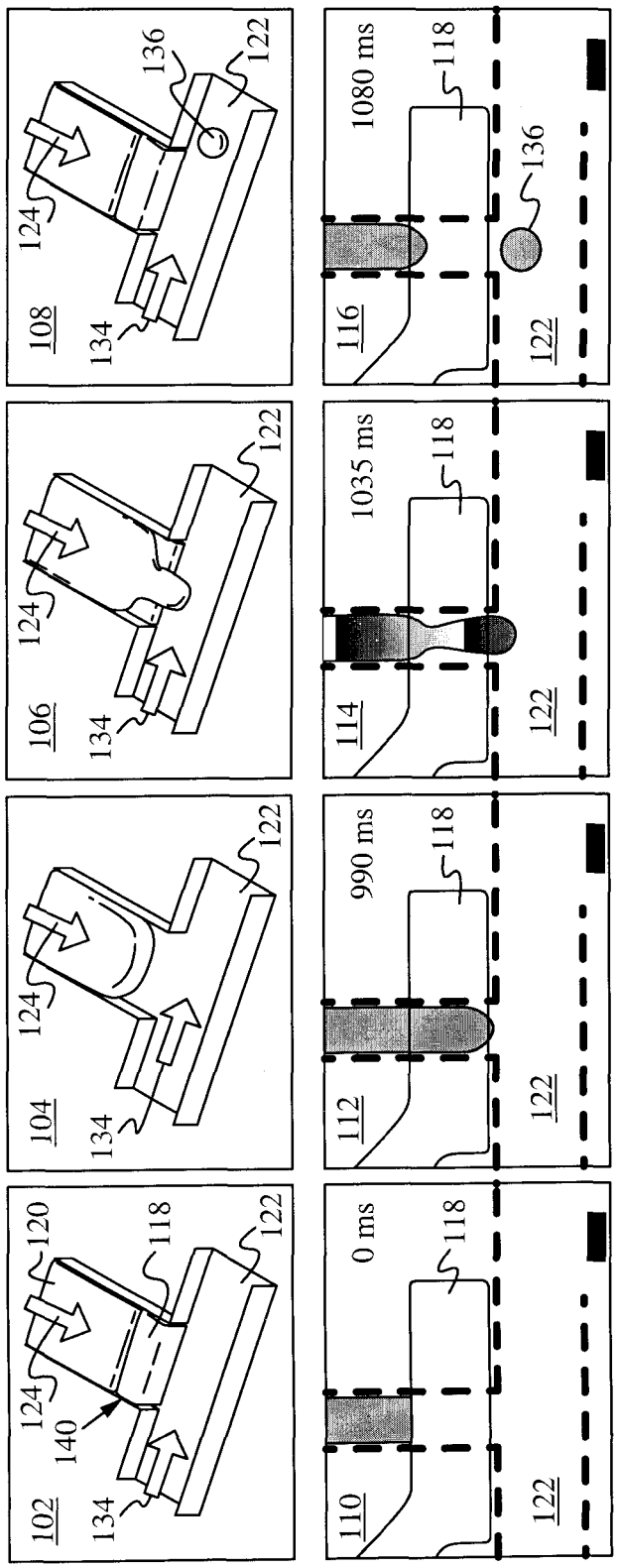
FIG. 1 illustrates a programmable microfluidic device in accordance with some embodiments.

FIG. 1 illustrates a programmable microfluidic device 100 in accordance with some embodiments. In some embodiments, the programmable microfluidic device 100 contains main flow channel 122, side flow channel 120, and mechanical valve 118. The programmable microfluidic device 100 is able to perform a mechanical breakup at the microfluidic T-junction for temporal control independent from the size control. In some embodiments, one main flow channel 122 forms a T-junction with the side flow channel 120. A continuous phase is able to flow along the main flow channel 122 and a discrete phase is able to flow into the main flow channel 122 via the side flow channel 120. The discrete phase flow is able to be controlled by using a mechanical valve 118. The mechanical valve 118 is able to close the side channel by deflecting the channel wall 140. With this method, the droplet size is able to be fine tuned by adjusting the discrete phase dispensing duration. Moreover, the timing of droplet generation is able to be controlled independently from the size control by regulating the opening timing of the mechanical valve.

Some of the operational methods of the programmable microfluidic device 100 are illustrated herein. The status 102 shows that the mechanical valve 118 is closed, so that the fluid 124 in the side flow channel 120 are retained in the side flow channel 120 without going into the main flow channel 122. As shown in the drawing 110, the mechanical valve 118 is closed, and the fluid in side flow channel 120 is not entering the main flow channel 122. When the mechanical valve 118 is opened, the fluid 124 in the side channel 120 is pressured toward entering the main flow channel 122. As shown in the drawing 112, the fluid contained in the side flow channel 120 is entering and passing the mechanical valve 118. In the status 106, after a desired amount of fluid 124 passes the cut-off point of the valve 118, the valve 118 is able to be closed or narrowed in its opening to cut-off the fluid 124. As shown in the drawing 114, the fluid 124 from the side channel is forming a droplet and getting into the main flow channel 122. In the status 108, the mechanical valve 118 is closed or narrowed to a degree not allowing further fluid 124 passing through, so a droplet 136 is formed and enters into the main flow channel 122. As shown in the drawing 116, the droplet 136 is formed and entering the main flow channel 122. The droplet 136 will be transported along the channel 122 by the continuous phase flow 134 in the main flow channel 122.

Figure 2:
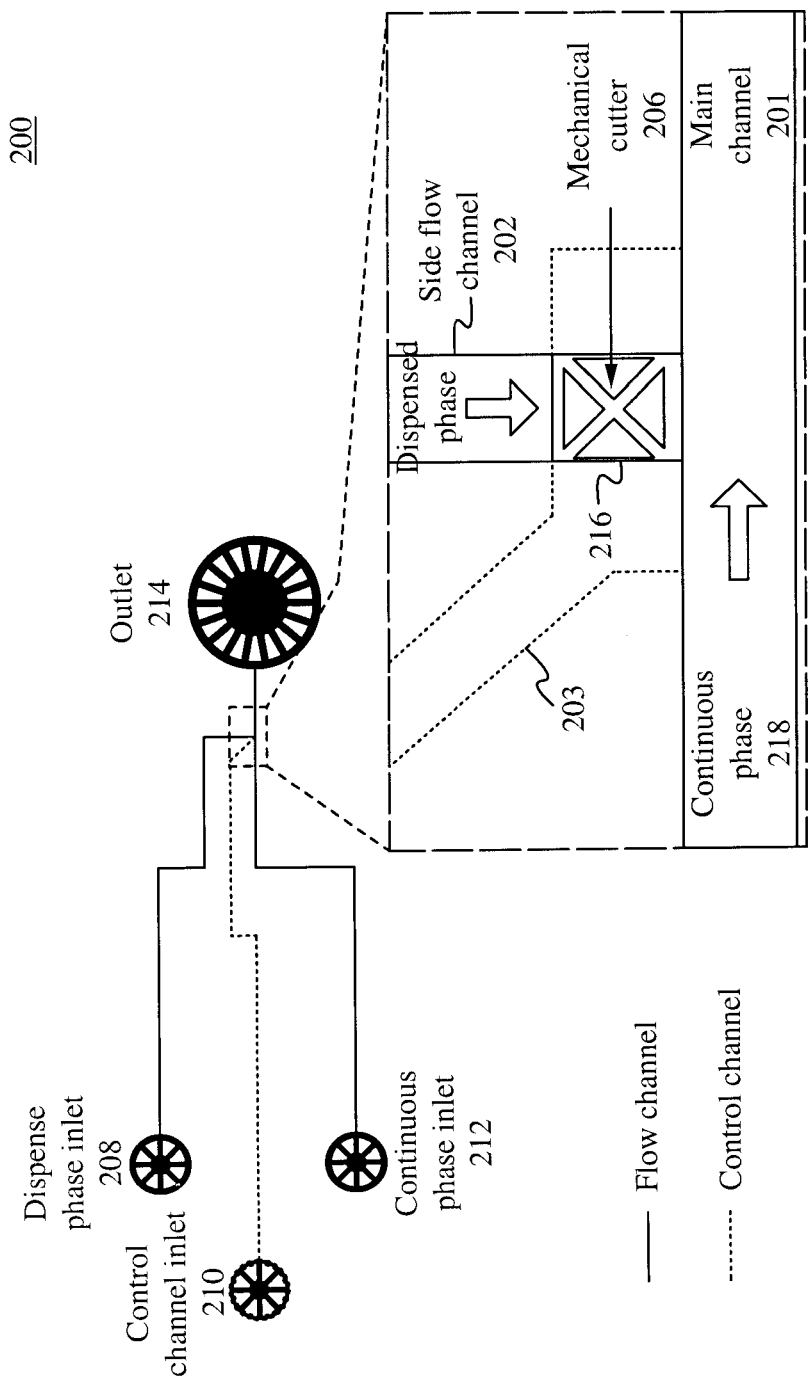
FIG. 2 illustrates a layout of a microfluidic chip in accordance with some embodiments.

FIG. 2 illustrates a layout of the microfluidic chip 200 in accordance with some embodiments. In some embodiments, a polydimethylsiloxane (PDMS) microfluidic chip is fabricated and tested based on the multilayer soft lithography. The continuous phase inlet 212 is able to provide continuous flow of fluid in the main flow channel 201 to the outlet 214, so the fluid from the side flow channel 202 entering into the main flow channel 201 is able to be transported into the outlet 201. The discrete and/or dispense phase inlet 208 is able to provide fluid for forming controlled size/amount/temporal droplets. The control channel inlet 210 is able to provide fluid to the control channel 203 causing pressure to control the membrane, the mechanical cutter, or the valve 206. The control channel 203 is able to pass underneath the side flow channel 202. The thin membrane 216 between the control channel 203 and the side flow channel 202 is able to function as a cutter 206. When the pressure in the control channel 203 is increased, the membrane 216 is deflected and cuts the discrete phase fluid into a droplet. When the pressure is released, the membrane 216 is restored to its original shape and the discrete phase flow is resumed. In some embodiments, the cutter is operated at 15 psi. A person of ordinary skill in the art would appreciate that any pressure ranges are able to be used so long as the pressure is able to control the amount, size, timing of formation, or a combination thereof of the droplets. For example, the pressure applied on the cutter is able to reduce and not totally stop the flow rate or flow amount of the fluid in side channel 202 into the main flow channel 201. In some embodiments, mineral oil is used for the continuous phase 218. In alternative embodiments, food dye is used in the discrete phase. Droplet size is able to depend on the discrete phase dispensing time/duration and the discrete phase flow rate. The dispensing time and/or duration is able to be controlled by using a custom-built LabVIEW program. In some embodiments, the pressure driving liquids are varied in the flow channel from 1.5 psi to 4 psi to control the flow rate.

Figure 3:
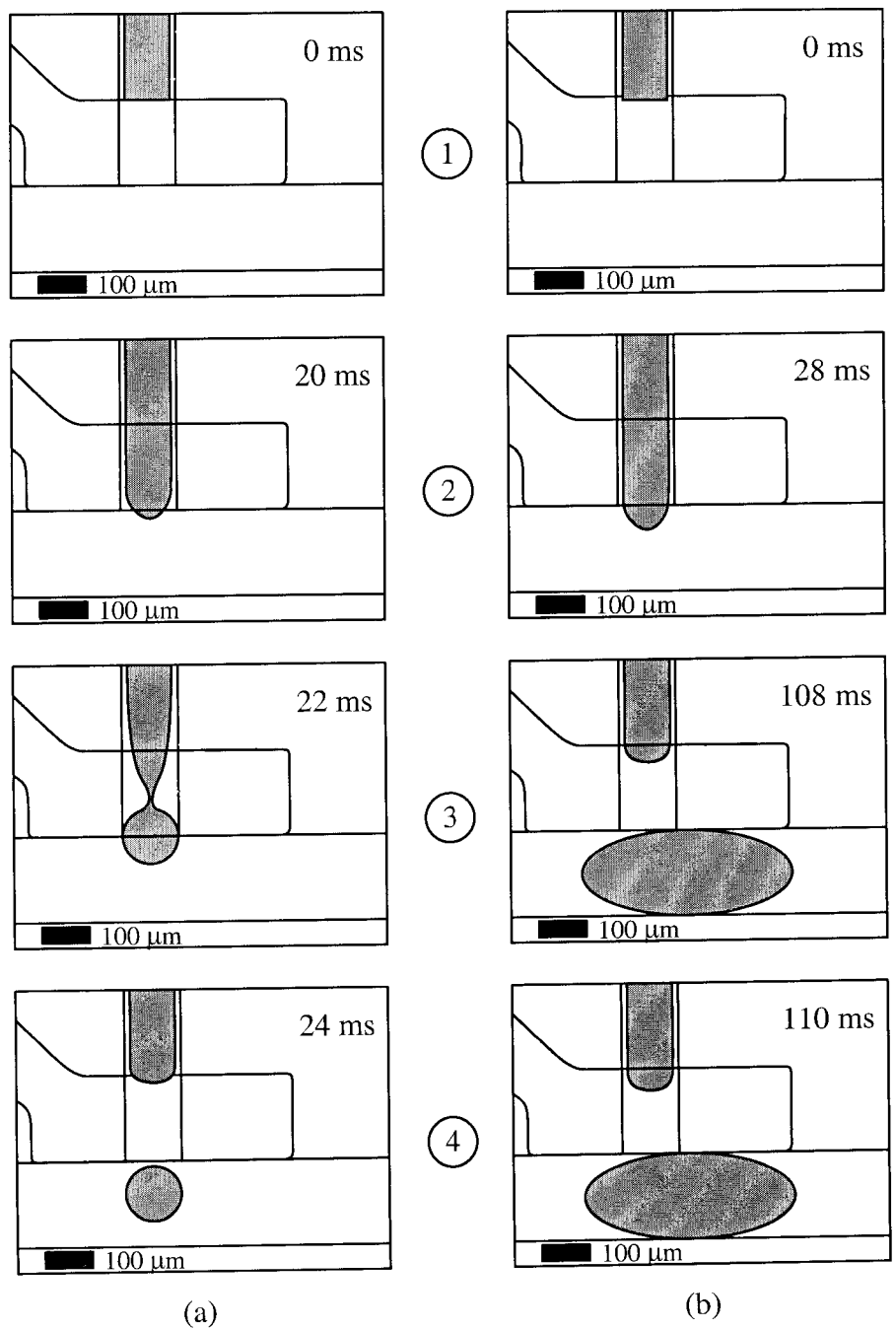
FIG. 3 illustrates a droplet generation method in accordance with some embodiments.

FIG. 3 illustrates a droplet generation method 300 in accordance with some embodiments. In some embodiments, the droplet generation method 300 is able to have variations in the dispensing time setting from 18 ms to 100 ms with images that are captured at 500 frames per second. The dispensing time setting matched the real dispensing time within 10 ms. The error is ascribed to the limit in the mechanical response of the system to the electrical control signal. The droplet size is decreased with decreasing dispensing time. In contrast, the droplet size is increased with increasing dispensing time. As shown in FIG. 3(a), the dispensing duration is about 18 ms. The FIG. 3(b) show the 100 ms dispensing time. Comparing the FIG. 3(a) with the FIG. 3(b), the droplet formed in 3(a) is smaller than the droplet formed in 3(b).

Figure 4:
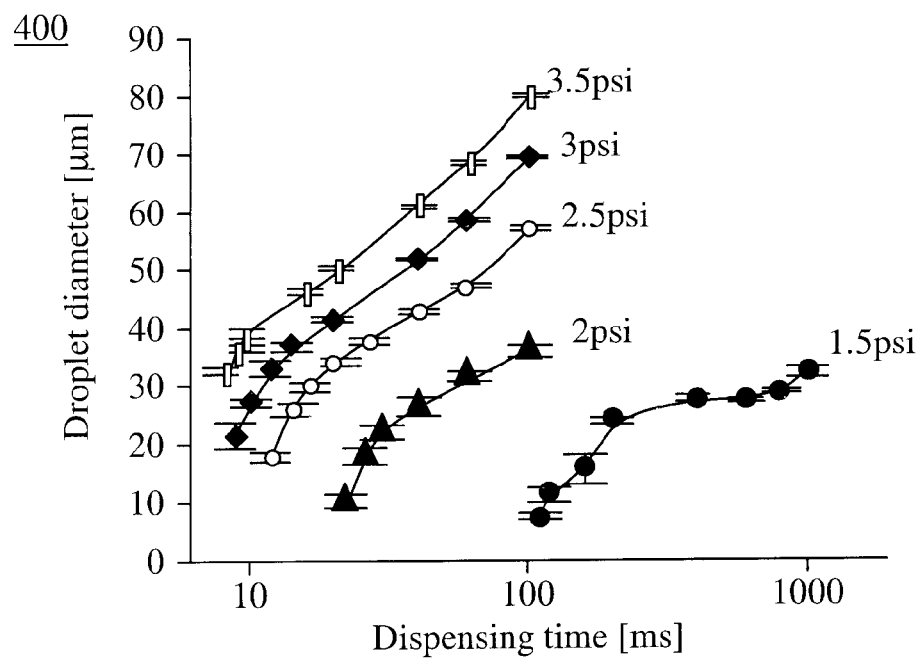
FIG. 4 illustrates a size and temporal control of the droplet formation method in accordance with some embodiments.

FIG. 4 illustrates the size and temporal control of the droplet formation method 400 in accordance with some embodiments. As shown in the FIG. 4, for the same dispensing time, the droplet size decreases as the pressure decreases due to the decreased flow rate.

Figure 5:
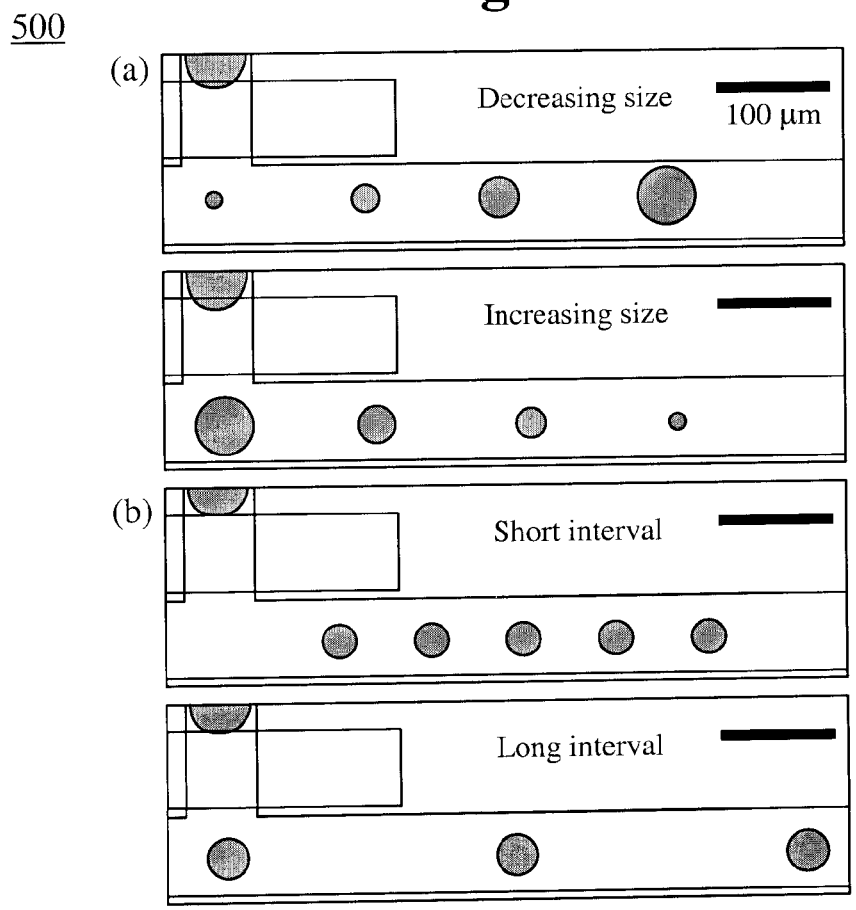
FIG. 5 illustrates the micro droplet generation method in accordance with some embodiments.

FIG. 5 illustrates the micro droplet generation method 500 in accordance with some embodiments. As shown in FIG. 5, the droplet size and droplet generation time and/or interval can be finely and independently controlled. Hence, the method 500 has the great potential to realize highly flexible droplet-based microfluidic systems providing various test environments compartmentalized within micro droplets with different sizes on a chip.

Some experiments using a micro droplet generator that mechanically breaks off the dispensed phase into droplets in a microchannel T-junction have been designed, fabricated, and carried out in accordance with the embodiments described above. Similar to the working function of the programmable microfluidic device 100 of FIG. 1, one main flow channel forms a T-junction with the other side flow channel. A continuous phase is able to flow along the main channel. A dispensed phase is able to flow into the main channel via the side channel. The dispensed phase flow is able to be controlled by using a mechanical valve. Droplets are able to be formed by completely closing the side channel filled with the dispensed phase. With this method, the droplet size is able to be finely tuned by adjusting the dispensing time of the valve. Furthermore, the droplet size is also able to be controlled by dispensing pressure. Moreover, the droplet generation timing and/or droplet generating intervals are able to be controlled independently from the size control by regulating the opening timing of the mechanical valve.

Further, similar to the layout of the microfluidic chip 200 of FIG. 2, a chip is able to be made of two layers: the top fluidic layer and the bottom control layer. The control channel passes underneath the side flow channel. The thin membrane between the control channel and the flow channel functions as a cutter. When the pressure in the control channel is increased, the membrane is deflected and cuts the dispensed phase into a droplet. When the pressure is released, the membrane is restored to its original shape and the dispensed phase flow is resumed.

Table 1 shows some examples of the dimensions of the flow channels, the cutters, and pressures in accordance with some embodiments. A polydimethylsiloxane (PDMS) microfluidic chip based on multilayer soft lithography is fabricated and tested. An optical microscope (Zeiss Axiovert 40 CFL) to observe the droplet generation inside the microchannels and to capture images by using a high speed digital camera (Vision Research Micro 4) is used. The determination of the droplet volume is based on the planar dimensions of the droplet. The planar dimensions of the droplet are able to be obtained from the captured image showing the generated droplet. When the droplet diameter is larger than the flow channel height, the droplet was assumed to have elliptical and elongated shape, and the droplet volume was estimated by using the planar dimensions of the droplet and the channel height. Otherwise, the droplet was assumed to be spherical, and the droplet volume was calculated by using the droplet diameter and the volume formula for spheres. The pressure is applied to the backside of the liquids to drive them inside the flow channel. The cutter is operated at 103.4 kPa in some embodiments. The control channel connected to the cutter is filled with water to avoid bubble formation inside the flow channel. The pneumatic control setup consisted of two sets of eight-channel manifolds (Fluidigm Corporation) controlled through a BOB3 control board (Fluidigm Corporation). A digital I/O card (National Instruments, PCI-6533), mounted in the computer, digitally controlled the switching of each channel of manifolds through the BOB3 control board. A custom-built LabVIEW (National Instruments) program is used for automatic control of the microfluidic chip. A 10.0% (v/v) pigment solution (ESCO Foods Inc.) and 0.1 and 0.5% (w/w) sodium alginate solutions were used for the dispensed phase. Mineral oil (Sigma) was used for the continuous phase. The viscosity of the tested liquids is listed in Table 2. It was measured with a viscometer (Galvanic Applied Science USA, Inc., VL200) at 21.6 C.

TABLE 1

Dimensions of microchannels and valve, and the experimental condition

Flow channel dimensions and flow driving pressure

| | Width (μm) | Length (mm) | Channel Height (μm) | | | Flow Driving Pressure (kPa) | | |
|---|---|---|---|---|---|---|---|---|
| | | | 1 | 2 | 3 | 1 | 2 | 3 |
| Main Channel | 90.0 | 7.5 | 11.5 | 13.6 | 15.3 | 10.3 | 13.8 | 17.2 |
| Side Channel | 50.0 | 7.5 | | | | | | |

Cutter dimension operating pressure

| | Width (μm) | Length (μm) | Operating pressure (kPa) |
|---|---|---|---|
| Valve | 50.0 | 90.0 | 103.4 |

TABLE 2

Viscosity of tested liquids

| | Dispensed phase | | | Continuous phase mineral oil |
|---|---|---|---|---|
| | 10% (v/v) pigment solution | 0.1% (w/w) sodium alginate solution | 0.5% (w/w) sodium alginate solution | |
| Viscosity (mPa s) | 1.00 | 3.27 | 10.14 | 32.80 |

The results of the above experiments are shown as following. Referring to FIG. 1, when the side channel 118 is opened, the dispensed phase 124 starts to flow into the main channel 122. As soon as the cutter is actuated to close the side channel, a neck of the dispensed phase is formed as shown in the status 106. As the neck becomes narrow, the interfacial tension force supporting the neck is decreased. Finally, when the cutter closes the side channel, the dispensed phase is cut and a droplet is formed as shown in the status 108. FIG. 5 shows the experimental results of the flexible micro droplet generation device in accordance with some embodiments. The droplet size is consecutively decreased or increased by changing the dispensing time/duration, dispensing pressure, or a combination thereof continuously. For the same dispensing duration, the interval between droplet generations is also able to be varied. The result of the droplet generation method clearly shows the capability of generating and manipulating the droplets with great flexibility. In traditional methods, the fluid of the dispensed phase is cut into droplets by the continuous phase flow, and the droplet size is determined by the balance between the drag force and the surface tension force. In contrast, the droplets are generated through mechanical cutting in some embodiments of the present application forming droplets as soon as the dispensed phase is mechanically cut by the membrane. For this case, droplet size is governed by the dispensing time/duration and the flow rate of the dispensed phase. The dispensing time/duration is controlled by using a custom-built LabVIEW program. To control the flow rate of the dispensed phase, the flow channel height, the pressure driving liquids in the flow channel, and the viscosity of the dispensed phase are varied.

Figure 6:
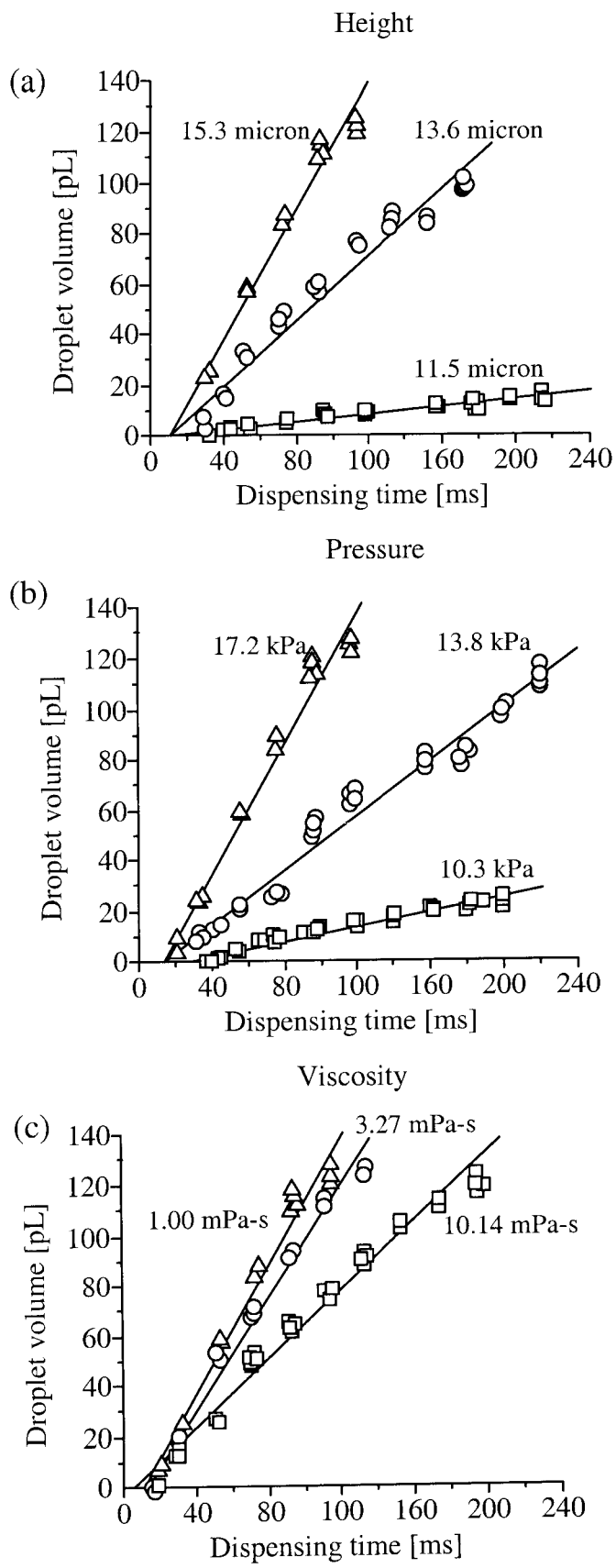
FIG. 6 shows the droplet size change according to a dispensing time in accordance with some embodiments.

FIG. 6 shows the droplet size change depending on the dispensing duration in accordance with some embodiments. As shown in the FIG. 6, the volume of the generated droplets ranges from 14 fL (femtoliter) to 126 pL (picoliter). The equivalent droplet diameter ranges from 3 to 62.2 µm. The droplet size increases as the dispensing duration increases. For the same dispensing time, the droplet volume increases with the flow channel height increase, the pressure increase, and the dispensed phase viscosity decrease. This is able to be ascribed to an increase in the flow rate of the dispensed phase, which is closely related to the droplet growth. For long dispensing durations (typically more than 50 ms), the droplet volume increases with the dispensing duration almost linearly. On the other hand, for shorter dispensing duration, the droplet volume increases as the dispensing duration increment decreases. The atypical behavior of droplet generation, below the 40 ms dispensing time, is able to be attributed to the poor mechanical response of the cutter or valve. The atypical behavior is able to be used for desired purposes. When the dispensing time is less than about 20 ms, the droplet is not generated in some embodiments due to the mechanical response limitations of the system to the electrical control signal. Accordingly, different materials and controlling systems, such as piezoelectric membranes, are able to be used to have a lower response time limit, such as 1 ms or 1 ps. Table 3 shows the effect of the dispensing time/duration on the droplet size. The standard deviation is less than 4 µm of an average value.

TABLE 3

Effect of dispensing time on droplet size (pressure: 10.3 kPa, channel heigh: 15.3 µm)

| | Measured valve open time (ms) | | | | | | | |
|---|---|---|---|---|---|---|---|---|
| | 35 | 42 | 58 | 74 | 94 | 115 | 135 | 156 |
| Average droplet diameter (µm) | 3.0 | 11.5 | 22.6 | 26.0 | 28.8 | 30.1 | 31.6 | 33.9 |
| Standard deviation (µm) | 0.0 | 2.1 | 3.2 | 1.2 | 0.4 | 0.7 | 0.7 | 0.2 |
| Average droplet volume (pL) | 0.014 | 0.8 | 6.4 | 9.2 | 12.5 | 14.3 | 16.6 | 20.4 |

Figure 7:
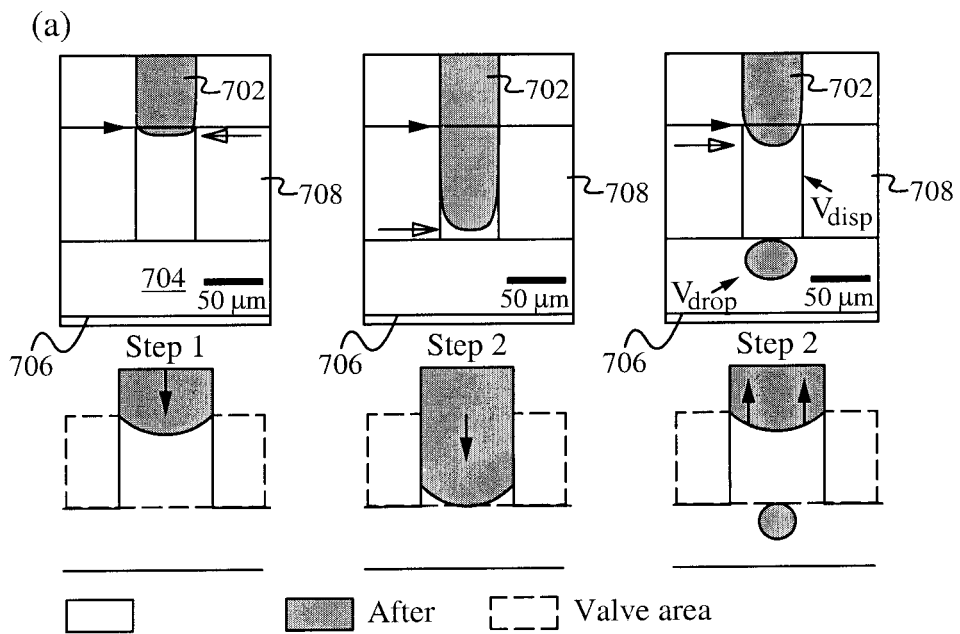
FIGS. 7(a)-(d) illustrate a descriptive model in accordance with some embodiments.
Figure 7:
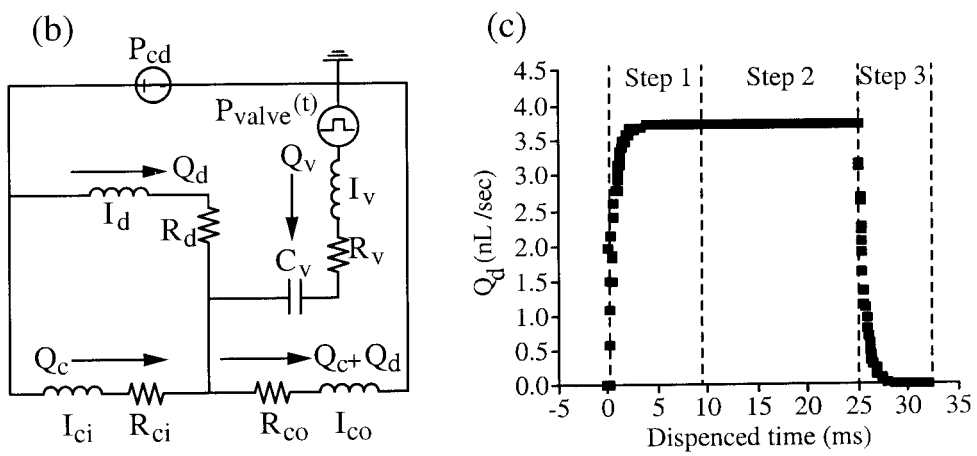
Figure 7:
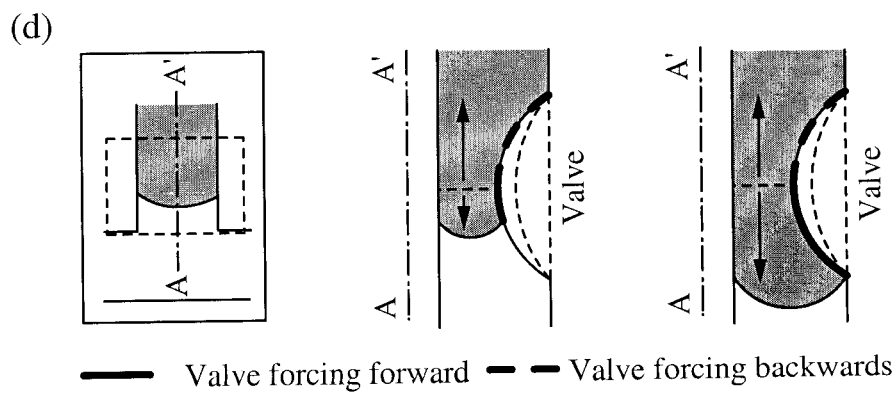

FIGS. 7(a)-(d) illustrate a descriptive model 700 in accordance with some embodiments. In some embodiments, the droplet growth and detachment contain three steps. During step 1, the side channel is opened, and the vacant space over the valve area is rapidly filled with the dispensed phase 702 and the continuous phase 704. The flow rate of the dispensed phase 702 decreases as the vacant space is filled with the immiscible fluids. When the dispensed phase comes in contact with the continuous phase 704, the flow rate of the dispensed phase reaches a steady state value. During step 2, the side channel is kept opened, and the dispensed phase 702 flows toward the main channel 706 at a constant flow rate. During step 3, the valve closes the side channel. When the valve is activated, the dispensed phase above the valve area tends to flow backward, and this reduces the final droplet volume. Next, the valve cuts the dispensed phase into a droplet. In some embodiments, the volume dispensed during step 1 does not add to the droplet volume, because the volume is pushed backward when the dispensed phase is cut by the cutter. In such case, the droplet volume is determined by the volume movement during steps 2 and 3. To estimate the dispensed volume during step 2, the flow rate of the dispensed phase should be obtained. To clarify important parameters affecting the flow rate of the dispensed phase, the flow channels are modeled as a network of flow impedance by using the analogy between the fluid flow and the flow of electricity (FIG. 7b). The flow rate and the pressure drop across a flow channel are analogous to the electric current and the electric potential difference across an electric resistance, respectively. With descriptive circuit model, we tried to predict the droplet formation cycle as shown in FIG. 7c. The cycle is able to explain the three steps described above, as per the experimental observations, depicted in FIG. 7a. FIG. 7d shows that the back flow rate of the dispensed phase during step 3 is dominated by the dispensed phase volume dispensed during steps 1 and 2. As shown in the cross-sectional view, when the dispensed phase is dispensed a little beyond the center line of the valve area, the dispensed phase is mainly forced backward, because the valve area forcing backward is larger than that forcing forward. On the other hand, when the dispensed phase is dispensed sufficiently beyond the center line, the dispensed phase above the valve area is forced bi-directionally and the ratio of volume moved backward is decreased.

Figure 8:
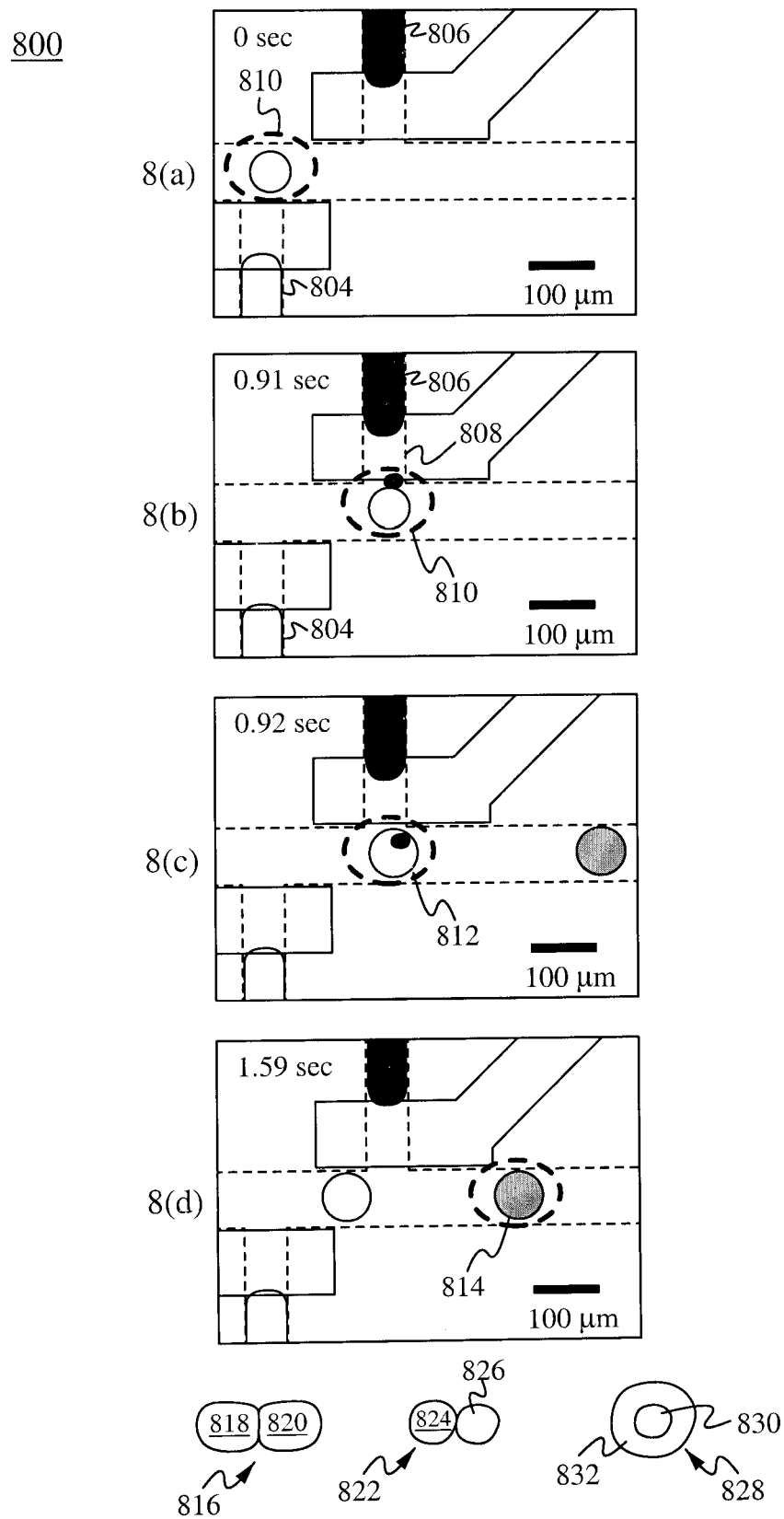
FIGS. 8(a)-(d) illustrate a droplet injection method in accordance with some embodiments.

FIGS. 8 (a)-(d) illustrate a droplet injection method 800 in accordance with some embodiments. As illustrated in the FIG. 8(a), the first droplet 810 is generated in the first side channel 804, and the droplet moves to the second channel 806. At 0.91 second as shown in FIGS. 8(b) and 8(c), the first droplet 810 arrives at the second channel 806. The mechanical valve 808 controls the injection of the fluid in the second side channel 806, so that the fluid in the second side channel 806 is able to be injected and merge with the first droplet 810 to form a second droplet 812. After some period of time, the fluid injected into the first droplet 810 mixes and diffuses evenly in the first droplet 810 and becoming a homogeneous second droplet 814, which is transported toward the next processing point or an outlet. [FIG. 8(d)] In alternative embodiments, the fluid in the second side channel forms a second droplet 816 after the fluid is injected into the first droplet 810. The droplet 816 is able to form a droplet with two regions 818 and 820. The region 818 is able to contain the fluid coming from the first droplet 810 and the region 820 is able to contain the fluid coming from the second flow channel 806. In other embodiments, the fluid in the second side channel forms two attached droplets 822 after the fluid is injected into the first droplet 810. The droplets 822 contain a droplet 824 and a droplet 826. The droplet 824 is able to contain the fluid coming from the first side flow channel 804 and the droplet 826 is able to contain the fluid coming from the second side flow channel 806. In some embodiments, the fluid in the second side channel forms a second droplet 828 after the fluid is injected into the first droplet 810. The second droplet 828 is able to contain an inside droplet 830 containing the fluid from the first side channel 804 and an outside layer 832 of the droplet containing the fluid from the second side channel 806 surrounding the inside droplet 830. A person of ordinary skill in the art would appreciate that the outside layer 832 of the droplet is able to come from the first side channel 804 and the core of the droplet 830 is able to come from the second side channel 806.

Figure 9:
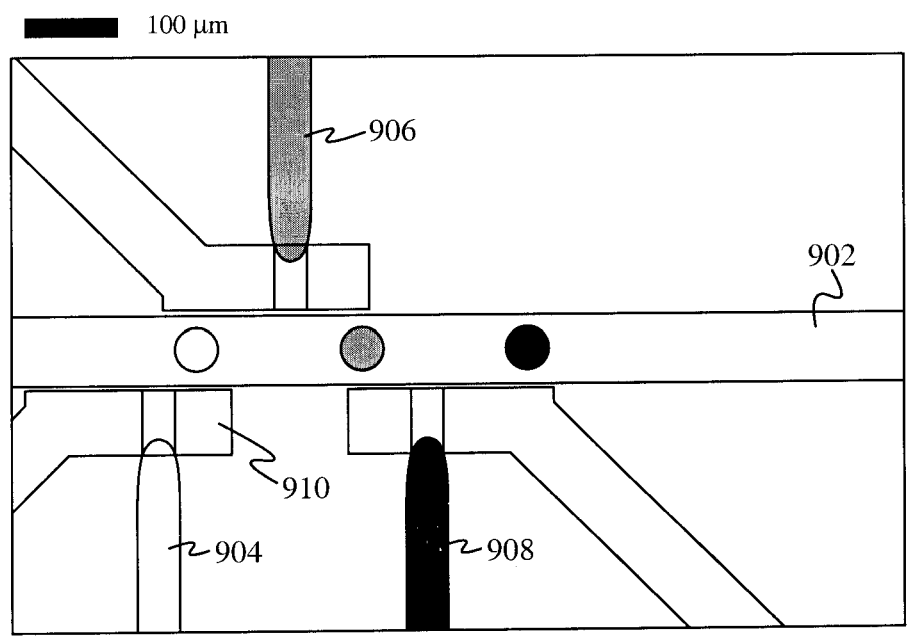
FIG. 9 illustrates a multiple droplet injection system in accordance with some embodiments.

FIG. 9 illustrates the multiple droplet injection system 900 in accordance with some embodiments. The multiple droplet injection system 900 is able to contain a main flow channel 902 and side flow channels 904, 906, and, 908. In some embodiments, the main flow channel 902 has a continuous flow to an outlet. The side flow channel 904 is able to generate the first droplet. The second and third side channels 906 and 908 are able to be optionally injecting the fluids into the first droplet or skipping from adding fluid into the droplet. For example, the first side flow channel 904 is able to generate the first droplet with first type of fluid. When the first droplet arrives at the second side channel 906, the second side flow channel 906 is able to inject the second type of the fluid to be merged with the first droplet and forming a droplet containing the fluids of the first side flow channel 904 and the second side flow channel 906. Similarly, the droplet is able to add a third type of fluid at the third side flow channel 908 forming a droplet containing fluids from the first side flow channel 904, the second side flow channel 906, and the third side flow channel 908.

In alternative embodiments, the main flow channel 902 is able to have the fluid flow controlled in any tempo, any directions, or any rates as desired. For example, the fluid flow in the main flow channel 902 is able to be stopped at certain predetermined time or predetermined frequencies. In some examples, the flow directions in the main flow channel 902 are able to be changed at any time. By injecting the independently formed droplets in the main channel 902, various micro environments are able to be created and the ratio of the various reagents mixed are able to be flexibly controlled. A person of ordinary skill in the art would appreciate that the flow rates, flow directions, flow manners, or combinations thereof are all variable. For example, the side channel 908 is able to connect to a vacuum or a pump, so that the droplet mixing with fluids from the first side channel 904 and the second side channel 906 is able to be removed from the main flow channel 902.

APPLICATIONS AND EXPERIMENTS

Figure 10:
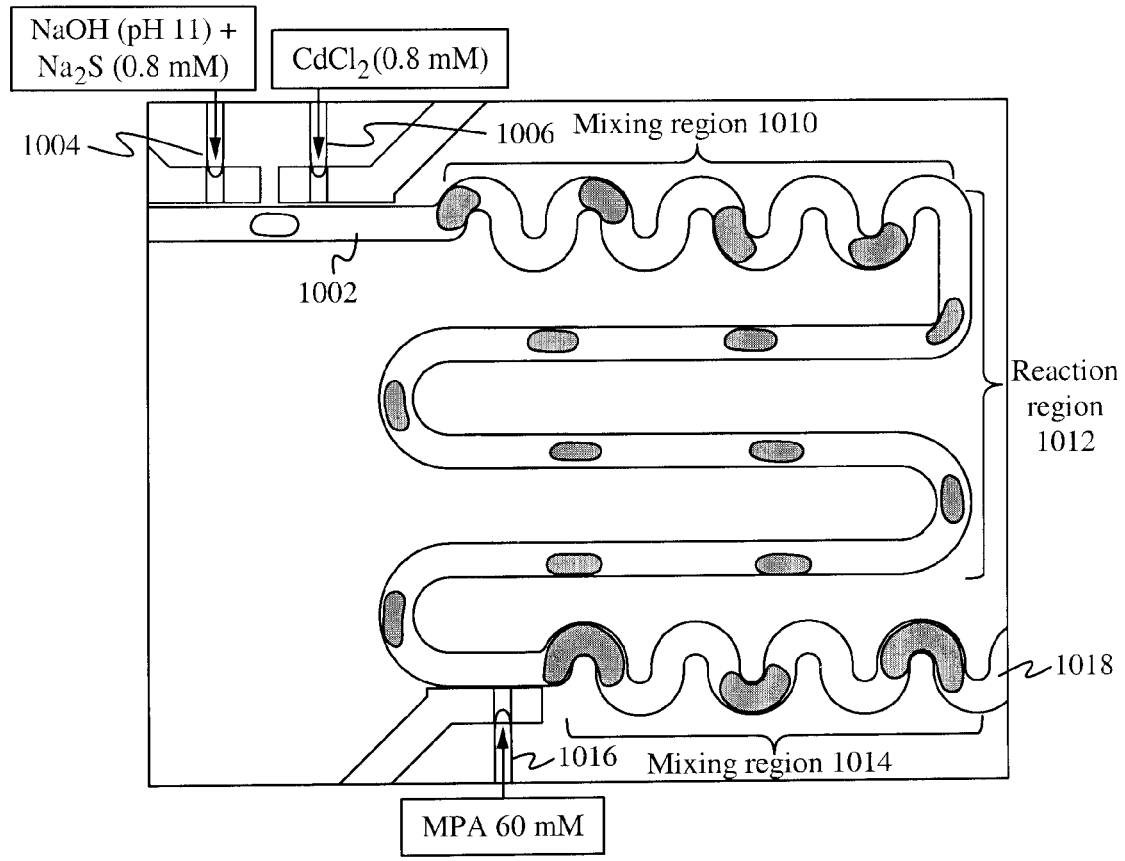
FIG. 10 illustrates a nanoparticle synthesis using a microfluidic chip in accordance with some embodiments.
Figure 10:
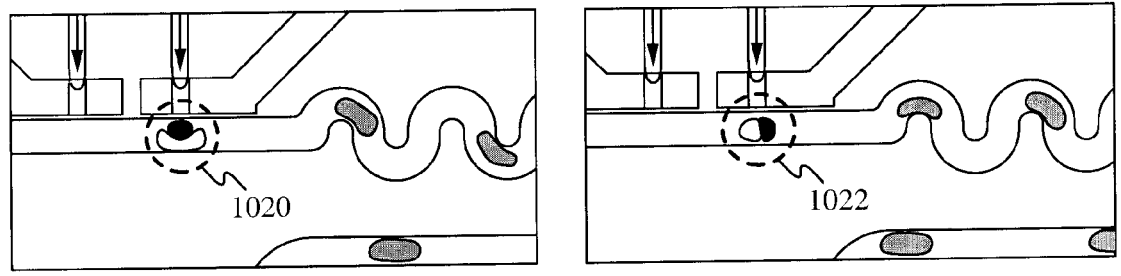

In some embodiments, the programmable microfluidic droplet system is applicable to nanoparticle and quantum dot synthesis. FIG. 10 illustrates the nanoparticle synthesis using a microfluidic chip 1000 in accordance with some embodiments. In the example, CdS nanoparticles are synthesized. As shown in Table 4, the concentration of the CdS corresponds to the less concentrated one of the $Cd^{2+}$ or $S^{2-}$.

TABLE 4

|  | $CdCl_2$ (4 mM) + MPA (4 mM) | $Na_2S$ (4 mM) + NaOH | Final concentration of the less ions |
|---|---|---|---|
| Case I | 1 | 0.5 | Concentration of $S^{2-}$ = 0.33 mM |
| Case II | 1 | 1 | Concentration of $S^{2-}$ = 2 mM |
| Case III | 1 | 2 | Concentration of $Cd^{2+}$ = 1.33 mM |

Further, Table 5 shows the volume ratio of the mixture.

TABLE 5

|  | $CdCl_2$ + MPA | $Na_2S$ + NaOH |  |
|---|---|---|---|
| 1:0.5 | 23 pl (pico-liter) | 6 | pl |
| 1:1 | 24 pl | 11.8 | pl |
| 1:2 | 24 pl | 23.3 | pl |

Still referring to FIG. 10, the microfluidic chip 1000 is able to contain main flow channel 1002, side flow channels 1004, 1006, 1016, mixing region 1010, 1014, and reaction region 1012. The first reactant, such as NaOH (pH 11) and $Na_2S$ (0.8 mM) is able to be generated in a form of a droplet from the side flow channel 1004 into the main flow channel 1002. The second reactant, such as $CdCl_2$ (0.8 mM), is able to be added, mixed, and merged with the first droplet. The droplet containing the mixture of the reactants is able to be transported to the mixing region 1010 for mixing. Next, the droplet is able to stay at the reaction region 1012 for a predetermined time for the reactions to progress. A third reagent, such as MPA 60 mM, is able to be added to the droplet from the side flow channel 1016. After the adding of the third reagent, the droplet is able to pass on to the mixing region 1014 and go to the outlet 1018. A person of ordinary skill in the art would appreciate that the shapes, patterns, length, width, and repetitions of the channels are variable. Moreover, the devices, systems, components, and methods that are typically able to be used in μ-TAS (Micro Total Analysis System), Lab-on-a-Chip, and MEMS (microelectromechanical systems) are able to be used together with some of the embodiments of the present application. The devices, systems, components, and methods described herein are applicable to the fields of microfluidics, microfabrication, nanotechnology, materials and surfaces analysis and synthesis, and detection technologies.

Still referring to FIG. 10, some of the applicable volume ratios of the mixtures are illustrated as the droplets 1020, 1022. The droplet 1020 contains 1:0.5 of ($CdCl_2$+MPA):($Na_2S$+NaOH) in volume. The droplet 822 contains 1:1 of ($CdCl_2$+MPA):($Na_2S$+NaOH) in volume.

Some controlled quantum dot synthesis experiments in accordance with some embodiments have been performed. The following is one of the examples.

Materials and Instruments $CdCl_2$ (99.99+%, Sigma-Aldrich) and $Na_2S$ (Sigma-Aldrich) were mixed to prepare the aqueous solutions, MPA (3-Mercaptopropionic acid, 99+%, Fluka) was mixed in $CdCl_2$ solutions. All experiments were carried out at room temperature, 20° C. UV/Visible Spectrophotometer (Ultrospec 2100 Pro, Amersham Biosciences) and the cell (5 μL, Hellma) were used to take spectra. All spectra were taken 20 minutes after the preparation of the samples. Transmission Electronic Microscopy and holey Carbon Film on 3 mm grid (TED PELLA, inc.) were used to take the electron micrographs.

On-chip experimental setup: the microfluidic chip was made from polydimethylsiloxane (RTV615, Momentive). Mineral oil (Molecular Biology Tested, Sigma) was used as the continuous phase. $N_2$ gas was used to apply the pressure on the liquids in channels. The pressure for the control valves were applied in digital sequence by time controller (BOB3, Fluidigm) and the program of National Instruments LabVIEW 8.5. Videos were taken with the Microscope (Zeiss, Axiovert 40CFL) and transferred into digital video through the camera (Moticam 1000, Motic) and the program Motic Images Plus 2.0. The results of the experiment show an increase in particle sizes when Cd:S ratio is small and a decrease in particle size when Cd:S ratio is large.

FIGS. 11A-D illustrate a digital information recording device 1100 in accordance with some embodiments. The digital information recording device 1100 contains a design capable of making a musical score in the chip. To make different sizes of micrometer droplets that have different intensities, two or three chemicals are used in some embodiments. The method of musical scores classification is described in Table 6. The discrete phase 1 (D1) channel inserts a pH indicator, and monobasic is inserted in the discrete phase 2 (D2) channel. The discrete phase 3 (D3) to the discrete phase 8 (D8) have different concentrations of dibasic. Bis-(carboxyethyl)carboxyfluorescein (BCECF) is chosen as a pH indicator to detect different pH levels made by the phosphate buffer. The pH of the phosphate buffer should be changed to mix different concentration dibasics to a constant concentration monobasic. The concentration of dibasic is calculated using equation (1).

$$K = \frac{[H^+][HPO_4^{2-}]}{[H_2PO_4^-]} \quad \text{Eq. (1)}$$

Where K is the equilibrium constant and [ ] is the concentration of each reactant and product. The musical scores C to B are indicated as shown in Table 6. The musical scores are displayed to detect their fluorescence intensity.

TABLE 6

Musical score using different pH indications

Chemical Reaction

| pH indicator | Monobasic (mM) | Dibasic (mM) | Measured pH | Score |
|---|---|---|---|---|
| BCECF (D1) | 10 (D2) | — | 6.1 | C |
| BCECF (D1) | 10 (D2) | 5.4 (D3) | 7.9 | D |
| BCECF (D1) | 10 (D2) | 13.6 (D4) | 8.1 | E |
| BCECF (D1) | 10 (D2) | 34.3 (D5) | 8.3 | F |
| BCECF (D1) | 10 (D2) | 86.1 (D6) | 8.6 | G |
| BCECF (D1) | 10 (D2) | 108.4 (D7) | 8.7 | A |
| BCECF (D1) | 10 (D2) | 216.3 (D8) | 8.9 | B |

Figure 11A:
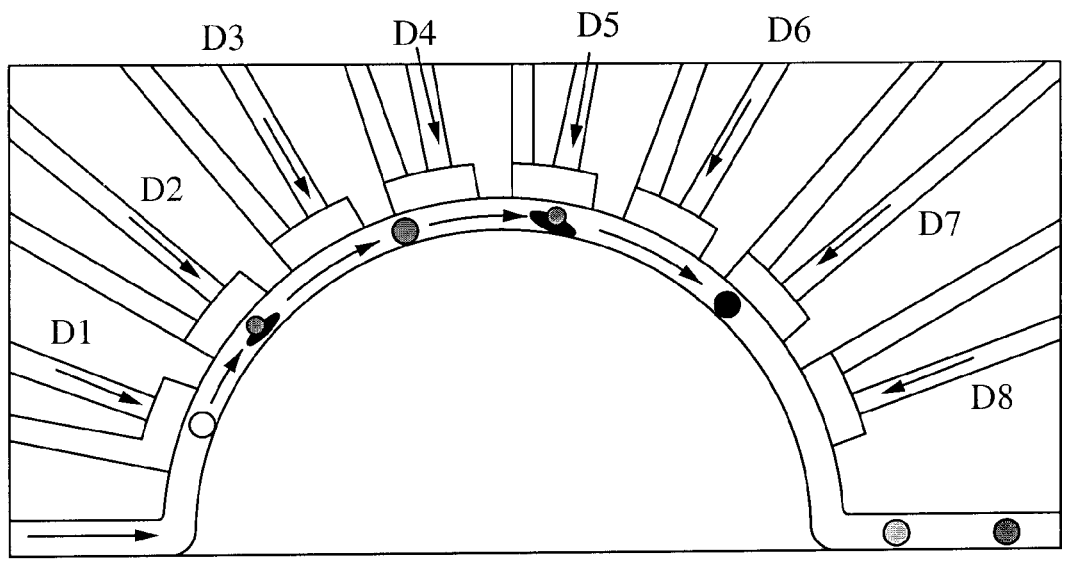
FIGS. 11A-D illustrate a digital recording device in accordance with some embodiments.
Figure 11B:
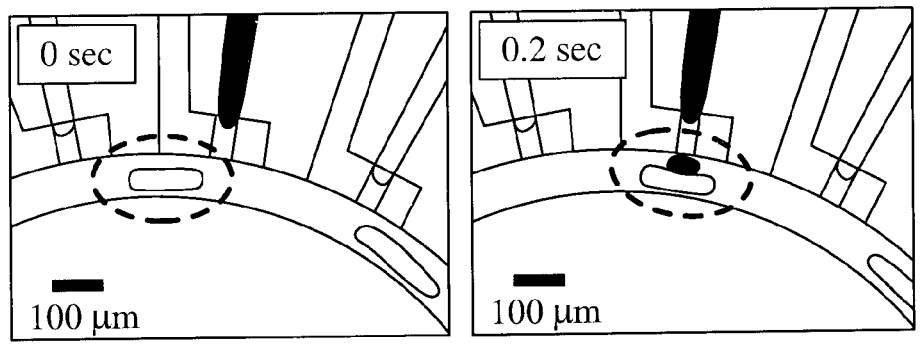
Figure 11B:
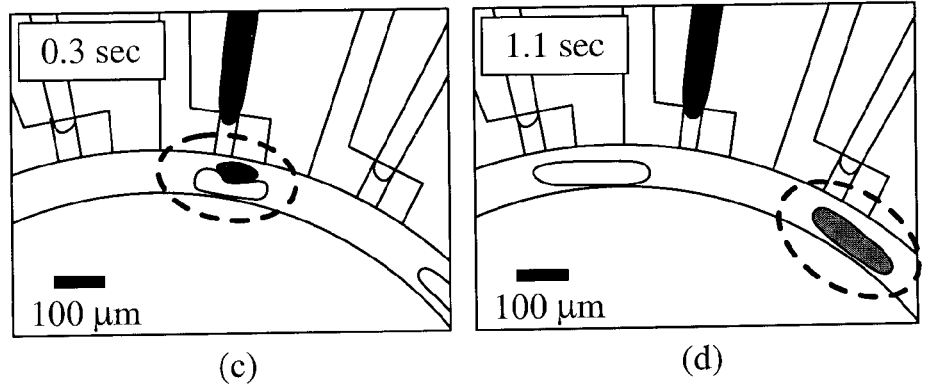
Figure 11C:
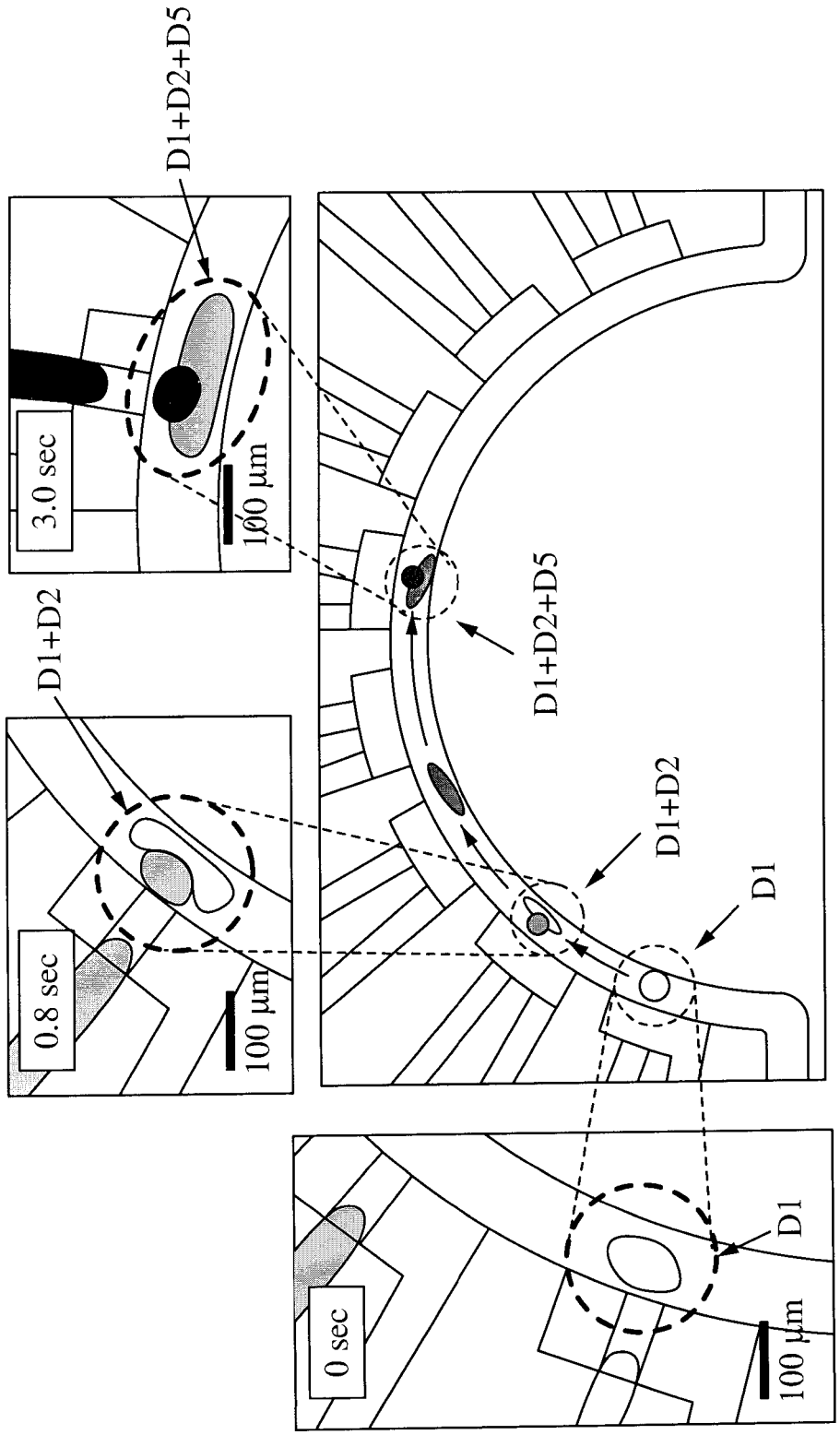
Figure 11D:
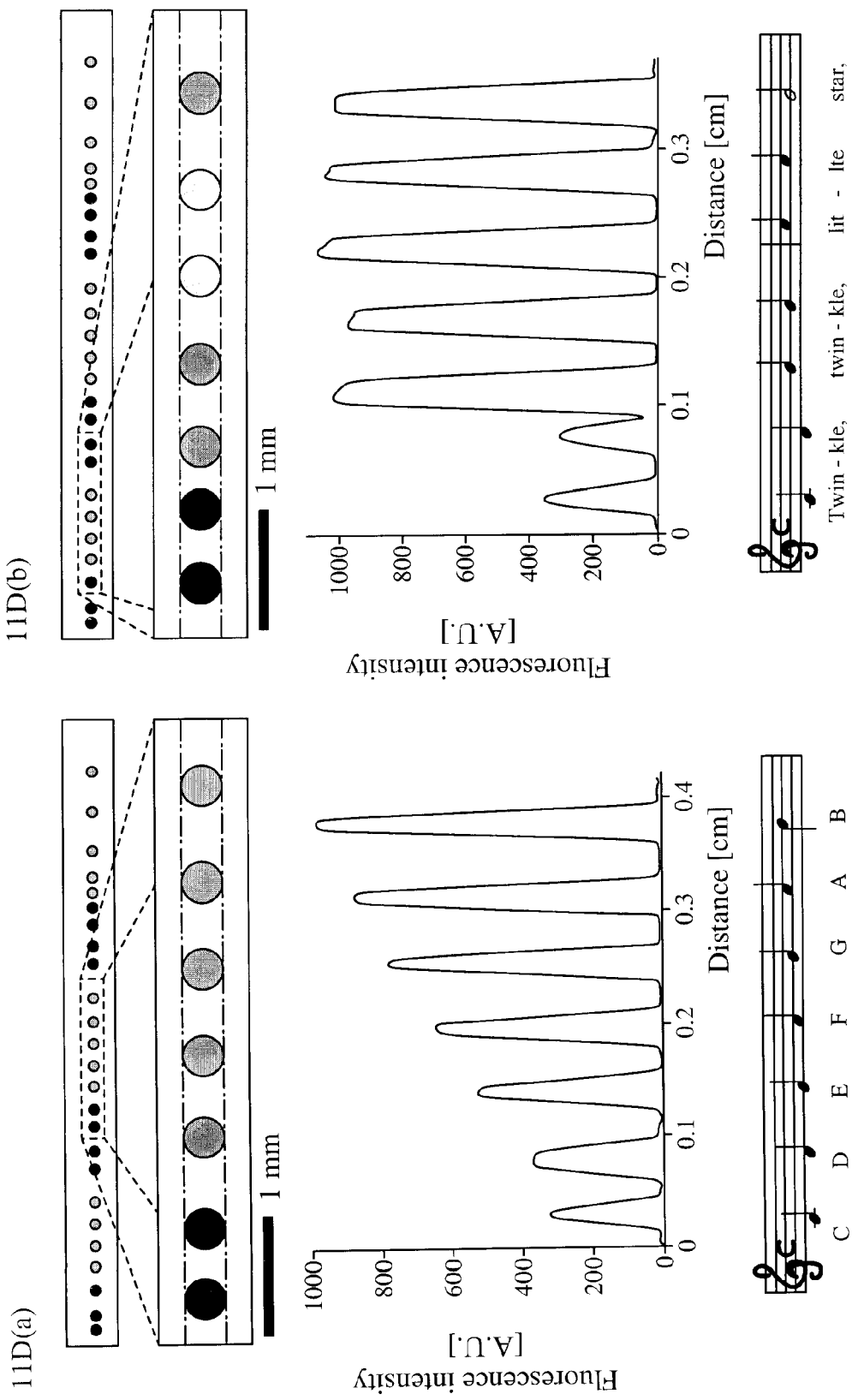

FIG. 11B shows droplet generation and injection inside the micro channel of the digital information recording device 1100. The discrete/dispensing phase is mechanically broken off into droplets in a micro channel and injected a droplet into another droplet. Initially, the first droplet is generated, and the second droplet is generated and injected as the first droplet located under the second channel (FIGS. 11B(b) and 11B(c)). Then the two droplets mix to flow into the continuous flow channel. Food dyes are introduced to show the process of the musical score generation. The first droplet is generated in D1, and the second droplet is generated and mixes with the first droplet. The musical score F is made by mixing three droplets as shown in FIG. 11C. Musical scores C to B are defined using pH indication as shown in FIG. 11D(a). The first two measures of "Twinkle Twinkle Little Star" as an example is recorded using the chip as shown in FIG. 11D(b).

As described above, the digital recording device 1100 is able to use a fluid addition method to independently control the sizes of the droplets and the concentration/compositions contained within the droplets. Such technology is able to be used as digital information recording device to record the information using the sizes of the droplets, the concentration of the substances within the droplet (e.g., the intensity of the fluorescence emitted by the substances contained), the chemical compositions of the substance contained in the droplet, or a combination thereof. For example, a 2 pl or an even number picoliter size droplet is able to represent a digital number 1. Further a 1 pl or an odd number picoliter size droplet is able to represent a digital number 0. The technology is also able to be applied to printers, such as pre-mixing of the inks before printing onto a receiving media, such as papers or clothes.

Figure 12:
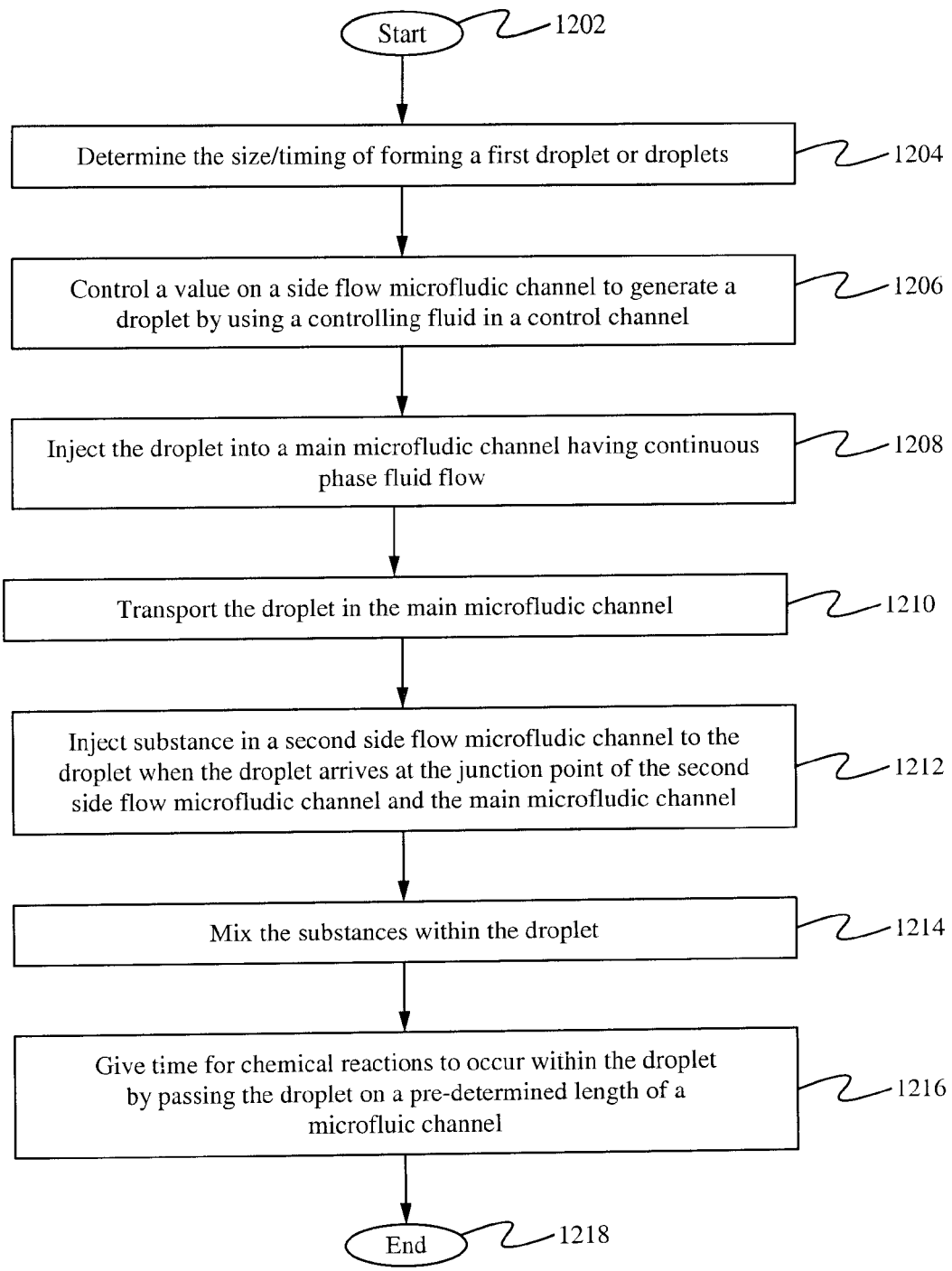
FIG. 12 is a flow chart illustrating a microfluidic reaction method in accordance with some embodiments.

FIG. 12 is a flow chart illustrating a microfluidic reaction method 1200 in accordance with some embodiments. In some embodiments, the microfluidic reaction method 1200 begins from Step 1202. At Step 1204, the size/timing of forming a first droplet is determined. At Step 1206, a valve on a side flow microfluidic channel is controlled to generate a droplet by using a fluid controllable membrane driven by a fluid in a control channel. At Step 1208, the droplet is injected into a main microfluidic channel having a continuous phase fluid flow. At Step 1210, the droplet in the main microfluidic channel is transported. At Step 1212, a substance in a second side flow microfluidic channel is injected to the droplet when the droplet arrives at the junction point of the second side flow microfluidic channel and the main microfluidic channel. At Step 1214, the substances within the droplet are mixed. At Step 1216, time is given for chemical reactions to occur within the droplet by passing the droplet on a length of microfluidic channel, such as an extension of the main fluid channel. At Step 1218, the process ends. A person of ordinary skill in the art would appreciate that all above steps/procedures are optional and additional steps are able to be added and/or repeated. Further, all the reaction conditions are able to be used or modified, including temperature, reagents, solvents, fluids, catalysts, and substrates for the microfluidic systems.

The present application is able to be utilized in catalyst synthesis, combinatorial reactions, chemical/enzyme kinetic studies, medical diagnosis, printer technology, memory devices, digital information storage technologies, and body imaginings. Some embodiments of the present application are capable of handling fluid volume in the scale of pico- and/or femto-liter. A fluid droplet in the pico-/femto-size gives limited space for reactions to occur, which is able to result in rapid reaction time. Thus, kinetic studies of enzymes are able to be performed using the devices and methods disclosed herein.

In operation, the microfluidic system of the present application is able to generate droplet sizes independent from the interval/timing of the drop generations. The sizes of the droplets are able to be controlled by the applied pressure and dispensing duration of the dispensing fluid. The intervals and timing of the droplets generation are able to be controlled by the applied pressure of the droplet cutter.

A person of ordinary skill in the art would appreciate that the sizes and time scales used herein are some of the examples. All other size scales are applicable. For example, the fluids in milli-, centi-, deci-, and atto- are applicable. Further, droplet delivery intervals and timing are variable, such as in nano second scale, micro second scale, minute scale, or in hour scale.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A fluidic system comprising a micro-sized or smaller-sized fluidic droplet generating unit for controlling an interval during which droplets are generated independent from controlling a size of the droplets, wherein the droplet generating unit comprises:
    a plurality of fluid dispensing channels;
    a droplet transportation channel fluidically coupled with each of the fluid dispensing channels forming a plurality of T-junctions;
    one or more pressure controllable valves coupled to each of the fluid dispensing channels where the fluid dispensing channels meet the droplet transportation channel, wherein each of the valves have a piezoelectric pressure deflectable membrane controlled by an electric signal to generate micro-sized or smaller-sized droplets; and a controller operatively coupled with the valves, wherein the controller is configured to manipulate the valves such that a first droplet from one of the dispensing channels is injected into a second droplet as the second droplet moves along the transportation channel.

2. The fluidic system of claim 1, wherein the pressure deflectable membrane is able to stop a fluid dispensed via the fluid dispensing channels when the signal is applied to the deflectable membrane.

3. The fluidic system of claim 1, wherein the size of the droplets is controlled by a dispensing duration controlled by the valve.

4. The fluidic system of claim 1, wherein the interval of the droplet generation is controlled by an opening time of the pressure controllable valve.

5. A fluidic reaction method comprising:
a. timing a moving droplet in a first fluid stream in a first fluidic channel; and
b. injecting an amount of a chemical substance in micro-sized or smaller-sized scale into the moving droplet from a second fluidic channel when the moving droplet arrives in a proximity of an outlet of the second fluidic channel, wherein the injecting is controlled by a pressure valve actuated by a second fluid and having a piezoelectric pressure deflectable membrane.

6. The method of claim 5 further comprising forming the moving droplet by a droplet generator.

7. The method of claim 6, wherein the droplet generator is located approximately at the junction of the second fluidic channel and the first fluidic channel.

8. The method of claim 6, wherein the droplet generator comprises a fluid controllable valve.

9. The method of claim 5, wherein the moving droplet and the chemical substance form a closed boundary within a stream of the first fluid.

10. The method of claim 5 further comprising merging the chemical substance with the moving droplet and becoming a second droplet.

11. The method of claim 10 further comprising causing the second droplet mixing more thoroughly by passing the second droplet through a section of a non-linear fluidic channel.

12. The method of claim 10 further comprising transporting the second droplet in a section of fluidic channel allowing a progress of a chemical reaction.

* * * * *